Dec. 10, 1963 KAZUYUKI SHIRAKURA 3,114,011

MAGNETIC HEAD ASSEMBLY

Filed March 7, 1961

Inventor
Kazuyuki Shirakura by Hill, Sherman, Meroni, Gross & Simpson Attys.

United States Patent Office 3,114,011
Patented Dec. 10, 1963

3,114,011
MAGNETIC HEAD ASSEMBLY

Kazuyuki Shirakura, Ohta-ku, Tokyo, Japan, assignor to Sony Corporation, Tokyo, Japan, a corporation of Japan Filed Mar. 7, 1961, Ser. No. 93,937
Claims priority, application Japan Mar. 9, 1960
6 Claims. (Cl. 179—100.2)

This invention relates to a magnetic head and more particularly to a magnetic head arranged to record signals simultaneously or separately on a plurality of magnetic recording tracks.

An object of this invention is to provide a novel magnetic head assembly which is simple and compact in construction and which may selectively be used for monaural or stereophonic recordings in an efficient manner.

Another object of this invention is to provide a novel magnetic head assembly which is particularly applicable to stereophonic recording and reproducing.

Still another object of this invention is to provide a novel multiple gap magnetic head where the width of the gaps transverse to a tape record member differ.

Other objects, features and advantages of this invention will become apparent from the following description taken in connection with the accompanying drawings, in which.

Figure 1:
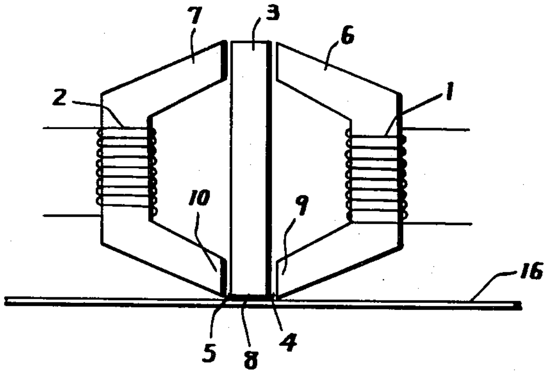
FIGURE 1 is a schematic side view of a magnetic head embodying the novel teachings of this invention.
Figure 2:
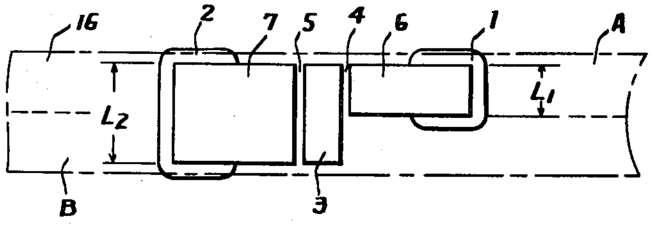
FIGURE 2 is a bottom view of the head shown in FIGURE 1.

The magnetic head illustrated in FIGURES 1 and 2 of the drawings includes a pair of signal coils 1 and 2 in which signal currents are arranged to flow. The coils 1 and 2 are mounted on a pair of generally C shape magnetic core members 6 and 7 respectively. Interposed between cores 6 and 7 and slighlty spaced from each is a common core member 3, preferably of planar shape. This spacing provides air gaps 4 and 5 having respectively different effective widths $L_1$ and $L_2$ resulting in magnetic flux paths therethrough of different widths. The magnetic cores 6, 7 and 3 may be of any desired shape, but preferably cores 6 and 7 are substantially C or arch shaped while core 3 is substantially planar (i.e., straight). Cores 6 and 7 are disposed as closely as possible to the two ends of the straight magnetic core 3 which is disposed between cores 6 and 7, as shown in FIGURE 1. In short, the operating non-magnetic gaps 4 and 5 should be formed between the end 8 of the magnetic core 3 and the respective lower ends 9 and 10 of the magnetic cores 6 and 7.

Figure 3:
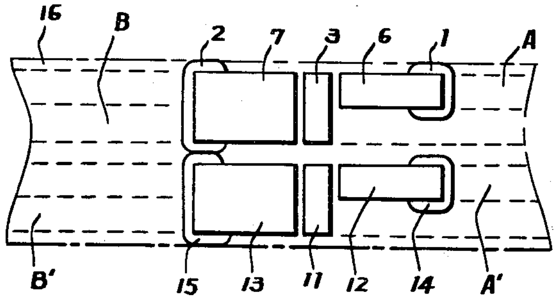
FIGURE 3 is a similar bottom view of another form of magnetic head embodying the teachings of this invention.

Heads of the type shown in FIGURES 1 and 2 may be combined to provide a plurality of such heads such as the pair shown in FIGURE 3. As shown in FIGURE 3, the second head of the group is provided with magnetic cores 11, 12 and 13 and a pair of signal coils 15 and 14. The common magnetic cores 3 and 11 may be formed integrally if desired. The terminals of the coils 1 and 2 and of the coils 14 and 15 may be connected to a proper electrical circuit, such for example, as to the outputs of amplifiers provided at the preceding stage. The heads are arranged to be used with a magnetic medium, such for example as a magnetic tape 16.

When a head assembly is constructed and employed as shown in FIGURE 2, signals may be recorded over approximately the entire width of the magnetic tape 16 by supplying the signals to the coil 2 on the side where the effective magnetic flux path width is $L_2$ and may also be reproduced from such records. When signals are supplied to the coil 1 on the side where the effective width is $L_1$ they are magnetically recorded and reproduced over approximately half of the width of the magnetic tape 16. In the latter circumstance the tape may be turned end for end to thereby use the other half of the tape. This enables two recording tracks A and B to be used. In the case where two magnetic head assemblies are combined as shown in FIGURE 3, either two or four tracks may selectively be employed. When coils 2 and 15 are energized, a two track system results, while if coils 1 and 14 are energized a four track system results. Thus with the system of FIGURE 3, energization of coils 2 or 15 could be used for monaural recordings and energization of coils 1 and 14 could be used for stereophonic recording and the tape would still be arranged to be reversed end for end. It will be noted that if signals are supplied to the coils 1 and 14 on the sides where the effective magnetic flux path and pole width is $L_1$, the signals are recorded and reproduced on the tracks A and A′ of the magnetic tape 16, while other signals can be recorded on and reproduced from the tracks B and B′ of the tape when the tape is reversed end for end. Thus, stereo signals may be recorded on and reproduced from four tracks.

Figure 4:
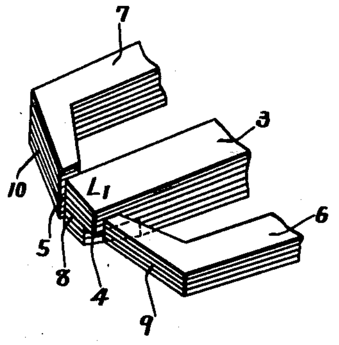
FIGURE 4 is a partial perspective view of another magnetic head constructed according to this invention.

FIGURE 4 shows another embodiment of this invention in which at the non-magnetic gap of shorter width $L_1$, the adjacent portion of the tip of the common magnetic core 3 which is not directly opposite the end 9 of the magnetic core 6 is cut back or tapered so as to eliminate or reduce fringing effects in the adjacent track. This means that the end portion of core 3 lying over the adjacent track is disposed a substantial distance away from the pole tip 9. Cross talk between the adjacent tracks thus will be minimized and at the same time unnecessary erasing of the other track can be effectively avoided.

According to this invention, as above described, a plurality of recording and reproducing elements of respectively different air-gap effective widths may be formed in a single magnetic head, and hence the magnetic head may be much reduced in size and a plurality of signals may be recorded and reproduced very easily without cross talk. Therefore, this invention is very advantageous, especially when applied to stereo recording and reproducing.

It will be apparent that many modifications and variations may be effected without departing from the scope of the novel concepts of this invention.

What I claim as my invention is:

1. A magnetic head assembly for transcription and reproduction of recordings comprising an intermediate core member, a pair of additional core members disposed on either side of said intermediate core member and spaced therefrom to provide a pair of non-magnetic gaps, one of said pair of additional core members being approximately half the width of the other core member of said pair, said intermediate core member being at least as wide as the wider core of said pair of core members, and said intermediate core member being cut back in the region spaced laterally from the narrower of said pair of core members.

2. A two track monaural, four track stereo magnetic head assembly for use with a travelling magnetic tape record member comprising a pair of intermediate core members, each approximately half of the width of said tape, a first pair of C shape core members each having respective ends forming pole tips spaced from but in close proximity to a different one of said intermediate core members and each being of a width approximately equal to one-half of the width of said tape, a second pair of C shape core members each having respective ends forming pole tips spaced from but in close proximity to a different one of said intermediate core members on the opposite side thereof from said first pair, each pole tip of said second pair being approximately one quarter of the width of said tape, and a signal coil mounted on each core member of each of said pairs.

3. A two track monaural, four track stero magnetic head assembly for use with a travelling magnetic tape record member comprising a pair of intermediate core members, each approximately half of the width of said tape, a first pair of C shape core members each having respective ends forming pole tips spaced from but in close proximity to a different one of said intermediate core members and each being of a width approximately equal to one-half of the width of said tape, a second pair of C shape core members each having respective ends forming pole tips spaced from but in close proximity to a different one of said intermediate core members on the opposite side thereof from said first pair, each pole tip of said second pair being approximately one quarter of the width of said tape, and a signal coil mounted on each core member of each of said pairs, the side of said intermediate core members facing said second pair being cut back in the region laterally spaced from the gaps formed by said pole tips of said second pair over which said tape is arranged to pass.

4. A magnetic head assembly comprising a common magnetic core, a plurality of magnetic cores which are disposed oppositely to said common magnetic core to form gaps having respectively magnetic flux paths of different widths, a face of said common magnetic core over which a magnetic record is arranged to pass and which is not opposite to the end of any of said plurality of magnetic cores being cut back so that it is lower than the face which is opposite to any of said plurality of magnetic cores, and signal coils wound on said plurality of magnetic cores.

5. A magnetic transducer head assembly comprising:

an intermediate common core member, a pair of additional core members disposed on either side of said intermediate core member and spaced therefrom to provide a pair of non-magnetic gaps, one of said pair of additional core members being approximately half the width of the other core member of said pair and oriented to place one edge in line with the edge of said other core member of said pair and its opposite edge aligned to bisect the face of said other core member to provide for scanning on half or the whole of a magnetic tape.

6. A magnetic transducer head assembly having a core member comprising:

an intermediate member, a pair of C-shaped members one end of each of said pair of members being in proximity to said intermediate member and the other ends of said pair of C-shaped members being disposed on respective different sides of said intermediate member to provide a pair of non-magnetic gaps, one of said pair of C-shaped members being approximately half the width of the other core member of said pair and oriented to place one edge in line with the edge of said other core member of said pair and its opposite edge being aligned to bisect the face of said other core member, said intermediate member being at least as wide as said other core member of said pair of C-shaped members.

References Cited in the file of this patent

UNITED STATES PATENTS 2,885,488 Andrews ---------------- May 5, 1959